J. CARLSON.
CLOTHES LINE REEL.
APPLICATION FILED JUNE 22, 1915.
1,225,766.
Patented May 15, 1917.
2 SHEETS—SHEET 2.
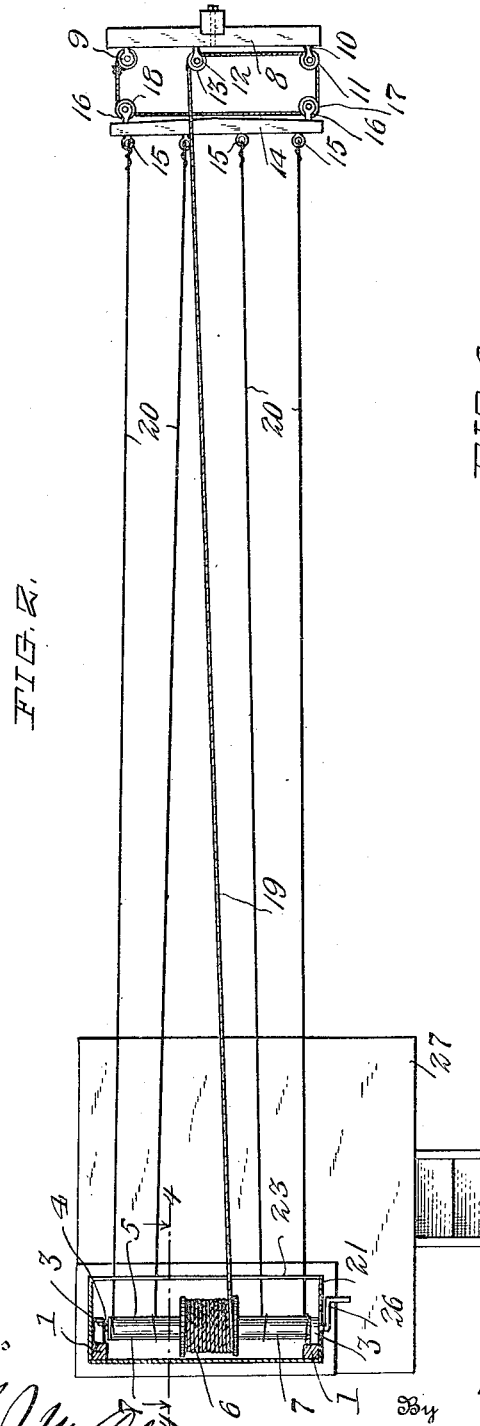
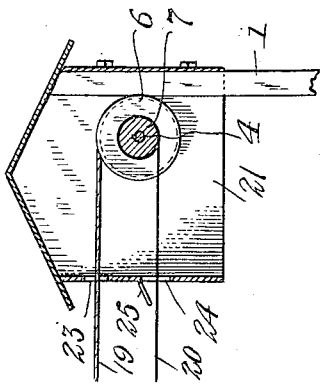
Witness
John J. M[...]
Inventor
John Carlson
By Victor J. Evans
Attorney

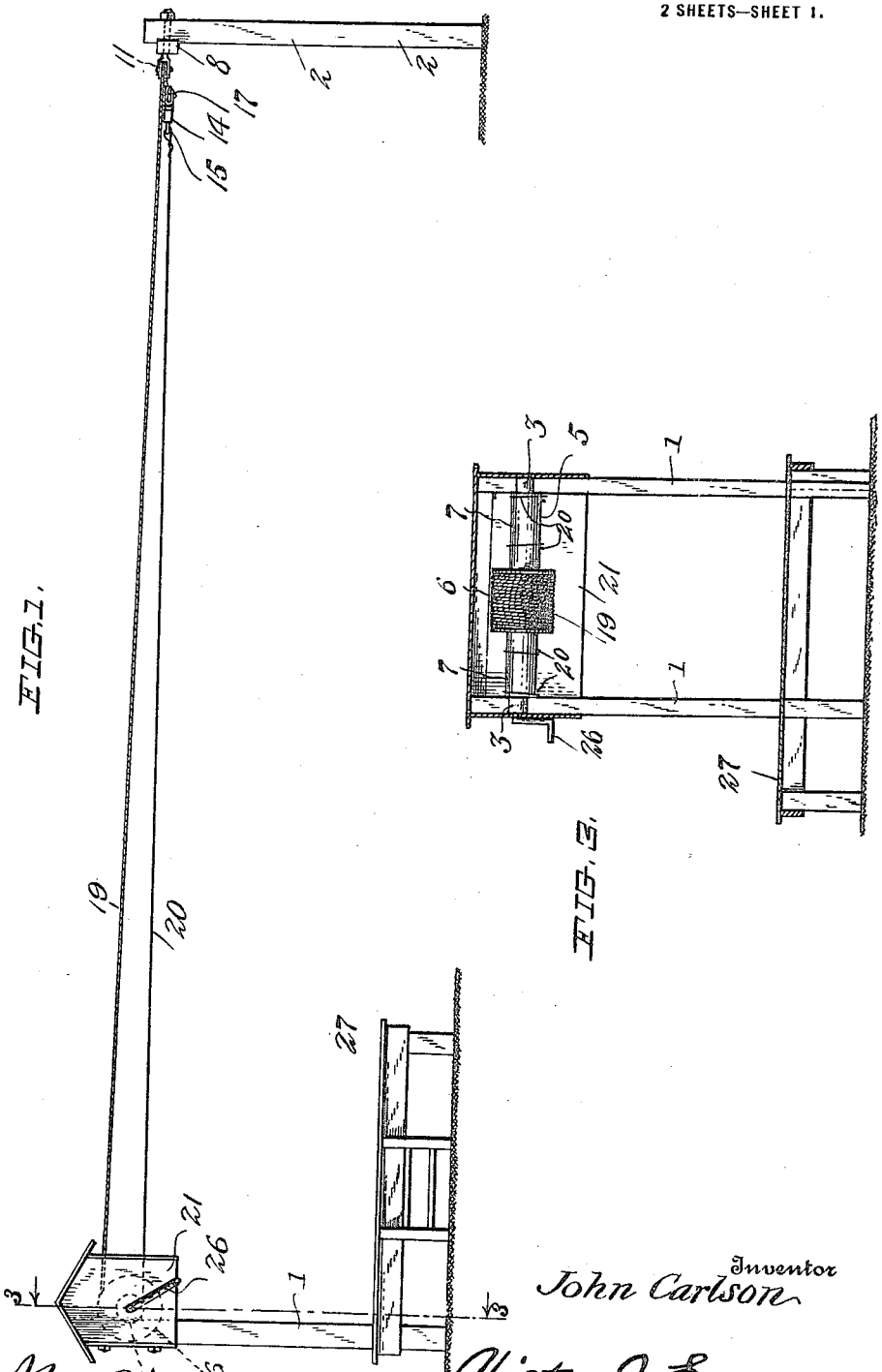

UNITED STATES PATENT OFFICE.

JOHN CARLSON, OF FORT WILLIAM, ONTARIO, CANADA.

CLOTHES-LINE REEL.

1,225,766.

Specification of Letters Patent.   Patented May 15, 1917.

Application filed June 22, 1915. Serial No. 35,681.

*To all whom it may concern:*

Be it known that I, JOHN CARLSON, a citizen of Canada, residing at Fort William, in the Province of Ontario and Dominion of Canada, have invented new and useful Improvements in Clothes-Line Reels, of which the following is a specification.

This invention relates to improvements in clothes line reels and has particular application to a hand operated reel.

In carrying out the present invention it is my purpose to provide a hand operated clothes line reel which may be operated easily and conveniently to wind and unwind the line and whereby the lines may be held in an out of the way position when not in use and covered so that such lines will be protected from the elements, dust, dirt and other foreign matter.

It is also my purpose to provide a clothes line reel which will carry a plurality of lines and whereby all of such lines may be wound up simultaneously and paid out in like manner, and whereby the user of the reel may wind up and pay out lines to the required extent without other aid.

A further object of the invention is to improve and simplify the general construction of clothes line reels and to provide a reel whereby any number of lines may be taken care of conveniently and wherein the component parts of the device will be so arranged and correlated as to reduce the possible derangement to a minimum.

With the above and other objects in view and others of a like nature the invention consists in the construction, combination, and arrangement of parts set forth in and falling within the scope of the appended claims.

In the accompanying drawings.

Figure 1 is a view in side elevation of a device constructed in accordance with the present invention, the clothes lines being shown as extended.

Fig. 2 is a top plan view of the same.

Fig. 3 is a sectional view on the line 3—3 of Fig. 1.

Fig. 4 is a similar view on the line 4—4 taken at right angles to Fig. 3.

Referring now to the drawings in detail 1—1 designates standards spaced apart in parallelism and arranged side by side and having the lower ends thereof embedded in the earth.

Another standard 2 is spaced apart from the standards 1—1 a suitable distance and has the lower end thereof secured in the ground. This standard 2 is preferably disposed in line with the center of the space between the standards 1—1. Secured to the standards 1—1, respectively, adjacent to the upper ends of such standards are horizontal alining bearings 3 and journaled in the bearings 3 and capable of rotation therein is a shaft 4. Keyed upon the shaft 4 between the bearings is a reel 5 having the central portion thereof circumferentially enlarged as at 6 to form a winding surface, and the portions at the sides of the enlarged central portion divided into winding surfaces 7, each of the necessary length. Fixed to the standard 2 adjacent to the upper end thereof is a cross bar 8 and secured to the cross bar 8 adjacent to one extremity is an eye 9 while secured to the cross bar in proximity to the other extremity is a bracket 10 in which is rotatably mounted a sheave 11. Connected to the cross bar 8 of the central portion thereof is a central bracket 12 carrying a sheave 13. 14 indicates a bar preferably of a length equal to the similar dimension of the reel 5 and equipped with eyes 15 corresponding in number with the sections 7 of the reel 5.

Secured to the edge of the bar 14 opposite from the eyes 15 are brackets 16—16 carrying sheaves 17—18 respectively and these sheaves 17 and 18 correspond with the sheave 11 and eye 9 on the cross bar 8. Secured to and arranged about the enlarged central portion 6 of the reel 5 is one end portion of the feed rope 19 having the remaining end portion thereof trained over the sheaves 13—11—17 and 18, in the order named, and then secured to the eye 9.

Thus the bar 14 is held in proper relation to the cross bar 8 and when the reel 5 is rotated to wind up the feed rope, the bar 14 is drawn toward the cross bar 8. To each eye 15 is fastened one end of a rope 20 constituting a clothes line and the remaining ends of the clothes lines 20 are secured to the winding surfaces or sections 7 respectively, of the reel 5 and are designed to wind upon such sections in a direction opposite from the winding of the feed rope 19 on the central portion 6 of the reel, so that when the feed rope 19 is being wound upon its particular section of the reel, the clothes lines will be unwound from their particular sections of the drum, and vice versa, the.

clothes lines will be wound upon the drum on the unwinding of the feed rope.

Suitably secured to the standards 1—1 and inclosing the reel 5 is a housing or casing 21 having the front wall thereof formed with a slot 23 through which the feed rope passes and with a relatively long slot 24 through which the clothes lines 20 pass. On the upper edge of the slot 24 is hinged a door 25 whereby the slot 24 may be closed when desired. One end of the shaft 3 projects through the corresponding end wall of the casing and detachably associated with the projecting end of the shaft is a crank handle 26 whereby the shaft may be revolved.

In practice, assuming the clothes lines 20 to be extended or unwound, as illustrated in Figs. 1 and 2 of the drawings and it is desired to wind up such lines, the shaft carrying the reel 5 is rotated under action of the handle 26 in a direction to wind up the lines 20 and pay out the feed rope 19 and in the continued rotation of the reel 19 the bar 14 passes through the slot 24 and into the housing, thus the clothes lines and the bar are inclosed and protected from the elements. To pay out the clothes lines the direction of rotation of the reel is reversed and the feed rope 19 in winding up pulls the bar 14 thereby drawing the lines 20 out of the casing so that the clothes may be hung upon such lines.

It will be noted that the central portion 6 of the reel about which the feed rope is adapted to wind is of greater diameter than the portions 7 carrying the clothes lines so that the feed rope is paid out and wound up at a greater speed than the lines 20 thereby compensating for the length of the feed rope with respect to the lines 20.

In the present instance a platform 27 is disposed adjacent to the standard 1 so that the reel may be conveniently operated and the clothes applied to, and removed from the lines as the latter are paid out and wound up respectively.

I claim:

1. In a device of the class described, in combination, a vertical post, a cross bar secured thereupon, an eye secured at one end of said cross bar, a pulley secured upon the opposite end thereof, a fixed support, a shaft mounted on said support, a drum fixed upon said shaft between its ends, a bar having a pair of pulleys secured at opposite ends and substantially spaced apart a distance equal to the distance apart between said eye and pulley on the cross bar, a feed rope wound around said drum, a pulley secured to the cross bar between its ends, said feed rope passing around the last named pulley over the pulley at one end of said cross bar, back around the two pulleys on the other bar and being secured to said eye, a pair of ropes secured upon said shaft at opposite sides of said drum but adapted to wind on the shaft when the drum unwinds, said ropes being secured at their opposite ends upon said second named bar for actuating the same in movement, and means for operating said shaft.

2. In a device of the class described, in combination, a support having a cross bar at its upper end, an eye and pulley secured respectively at opposite ends of said cross bar, a movable bar, a pair of pulleys secured upon the opposite ends of said movable bar, a pulley secured upon said cross bar between its ends, a rope passing over this last named pulley around the two pulleys on the movable bar and being secured upon said eye, a second support mounted thereon and connected to the movable bar, flexible means for operating said movable bar and means whereby said rope may be paid out in a direction opposite to that in which said movable bar moves.

In testimony whereof I affix my signature in presence of two witnesses.

JOHN CARLSON.

Witnesses:
  Oscar Ostrom,
  Sam Tritt.

Copies of this patent may be obtained for five cents each, by addressing the "Commissioner of Patents, Washington, D. C."